United States Patent Office 3,112,345
Patented Nov. 26, 1963

3,112,345
DIAMINO CYCLOHEXANOLS
Harry A. Stansbury, Jr., and David T. Manning, South Charleston, W. Va., assignors to Union Carbide Corporation, a corporation of New York
No Drawing. Filed Apr. 8, 1960, Ser. No. 20,841
10 Claims. (Cl. 260—563)

This invention relates to certain novel cyclic diamino alcohols and method of preparing them.

More specifically, this invention relates to diamino alcohols which have a six-carbon cyclic ring. These alcohols can be represented by the general formula

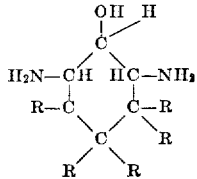

where each R represents hydrogen or an alkyl group containing from 1 to 18 carbon atoms.

Specific diamino alcohols include 2,6-diaminocyclohexanol; 2,6-diamino-3-methylcyclohexanol; 2,6-diamino-4-methylcyclohexanol; 2,6-diamino - 3 - ethylcyclohexanol; 2,6 - diamino-4-ethylcyclohexanol; 2,6-diamino-3-octylcyclohexanol; 2,6-diamino-4-octylcyclohexanol; 2,6-diamino-3,3,5-trimethylcyclohexanol; 2,6-diamino-3-dodecylcyclohexanol; 2,6-diamino - 3,3 - dimethyl,4-propylcyclohexanol; 2,6-diamino-3-butyl,4-pentyl,5-octylcyclohexanol.

These novel diamino alcohols may be combined with fatty acids to form soaps. They may also be used to absorb carbon dioxide from flue gas in the manufacture of Dry Ice. The novel alcohols also can be used as curing agents for epoxy resins to produce compositions which can be used as coatings.

The novel diamino alcohols of this invention are prepared by the catalytic reduction of 2,6-dioximinocyclohexanones.

2,6-dioximinocyclohexanone is well known in the art and was first prepared by reacting cyclohexanone with amyl nitrite and acetyl chloride as taught by Borsche (Chem. Zentr. 1909, II 1549). In the present case, the starting materials are prepared by reacting six carbon cyclic ketones with nitrosyl chloride in an ethanol solution containing pyridine.

The cyclic ketones which can be used correspond to the following formula:

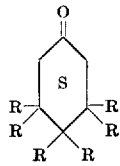

wherein each R is hydrogen or alkyl groups containing from 1 to 18 carbon atoms. The letter S is used to indicate that the ring is saturated. Since the positions adjacent to the carbonyl group are to be converted to oximino groups prior to reduction, no alkyl substituents can be present in these positions. Examples of the above ketones include cyclohexanone, the methyl, ethyl and octyl cyclohexanones and 3,3,5-trimethylcyclohexanone. These ketones can be prepared by catalytic reduction of corresponding phenol, alkyl phenol, cresol or xylenol followed by the oxidation of the intermediate cyclohexanol to yield the ketone.

The reaction between the ketone and nitrosyl chloride to obtain a 2,6-dioximinocyclohexanone can be illustrated as follows:

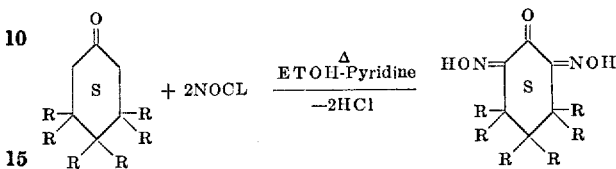

where the R's have the same meaning as previously stated.

It has now been discovered that these 2,6-dioximinocyclohexanones can be converted to the corresponding diamino alcohols by catalytic reduction. The catalysts employed are those which may be prepared from nickel, cobalt, platinum, palladium etc. The total pressure is not narrowly critical and can vary within the range of 100 p.s.i.g. to 5000 p.s.i.g. The temperature at which the reaction is carried out is within the range of 25–200° C. It is possible to carry out the reaction in either a batchwise or continuous fashion and an inert solvent such as ethanol, isopropyl alcohol or dioxane can be used although the reaction will proceed in the absence of a solvent. It is preferred to carry out the reaction in the presence of excess anhydrous ammonia since it has been found that better results are obtained when ammonia is present. The molar ratio of ammonia to ketone may vary from about 0 to 30:1. The preferred range is 10:1.

It is important in the process that the amount of catalyst be controlled since it is critical. The ratio of catalyst to ketone must be in the range of 1:50 to 2:1 by weight. If less than 2 parts of catalyst per 100 parts of ketone is used, the only product obtained will be a black, vitreous polymer.

The reduction of the ketone to the alcohol takes place in the following manner:

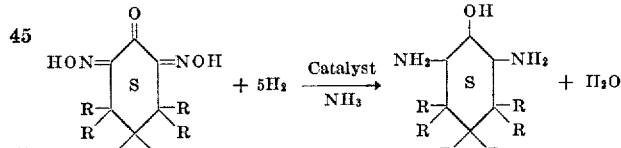

An intermediate product formed in the above reaction is

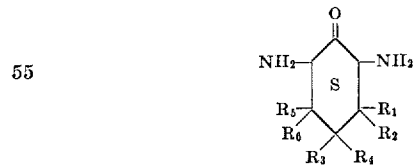

EXAMPLES

Example 1

A mixture of 30 grams (0.197 mole) of 2,6-dioximinocyclohexanone, 120 grams of wet Raney nickel, 155 grams of anhydrous ammonia (9.21 moles) and 1500 ml. of ethanol was charged to a 3-liter stainless steel rocker bomb and hydrogenated at 1500–1800 p.s.i.g. and 20–80° C. for a period of 4.8 hours. At the conclusion of the reaction, the mixture was allowed to cool and was then discharged. The mixture was filtered to remove the catalyst and volatile materials were evaporated under reduced pressure to give a dark residue weighing 23.6 grams. A 5.1-gram portion of the residue was subjected to vacuum sublimation yielding the following two sublimed white crystalline fractions with equivalent weight (as shown) determined by perchloric acid titration.

| Fraction | Weight | Melting Point | Equivalent Weight |
|---|---|---|---|
| 1 | 1.9 grams | 90–100° C | 69.05 |
| 2 | 0.8 gram | 95–107° C | 70.1 |

The theoretical equivalent weight of 2,6-diaminocyclohexanol is 65.1.

Example 2

A suspension of 70.7 grams (0.453 mole) of 2,6-dioximinocyclohexanone in 500 ml. of dioxane was charged to a 3-liter rocker bomb along with 170 grams (10 moles, 22:1 molar ratio) of anhydrous ammonia and 71 grams of wet Raney nickel. The mixture was hydrogenated at 1000 p.s.i.g. and 20–35° C. for a six-minute period at the end of which hydrogen uptake ceased. The temperature was then increased to 86° C. over one hour, and finally to 130° C., at 2000 p.s.i.g., where it was held for a two-hour period. The reaction mixture was then allowed to cool, upon which it was vented and discharged.

The reaction charge was stripped free of ammonia and dioxane under reduced pressure, leaving 51 grams of a dark syrupy residue which underwent slow crystallization upon storage in a vacuum dessicator. Vacuum distillation of the crude product through a goose-neck gave the diamino alcohol, B.P. 95–97° C./1.5 mm., which rapidly crystallized in the receiver to a white solid, M.P. 117–118° C. Approximately 30–33 grams of diamino alcohol, having a perchloric acid equivalent weight of 69.0 (theoretical EW=65), were obtained, corresponding to a yield of 50–55 percent (some hold-up in the still head occurred).

The 2,6-diaminocyclohexanol thus obtained was an extremely hygroscopic solid which decomposed (darkening) upon standing in a dessicator. A sample dried in vacuum over sodium hydroxide possessed bands in the infrared at 3.01 and 3.08 microns (NH$_2$ and OH), 6.25 microns (NH$_2$), 9.3 microns (secondary OH), and 10.1 microns (characteristic of cyclohexanols).

Example 3

2,6-DIAMINOCYCLOHEXANOL AS AN EPOXY RESIN HARDENER

The diglycidyl ether of bisphenol A (4.25 grams) and 2,6-diaminocyclohexanol (0.75 gram) were mixed in an aluminum weighing dish and heated to between 45° and 60° C., at which temperature a homogeneous mixture was obtained. Gelation of the mixture occurred immediately after a homogeneous mixture was obtained and the resulting gel was cured for 22 hours at 120° C., plus 6 hours at 160° C. There was obtained a tough, light amber colored resin which had a Barcol hardness[1] of 45.

What is claimed is:

1. A compound of the formula

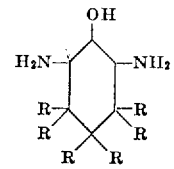

in which R is selected from the group consisting of hydrogen and alkyl groups containing from 1 to 18 carbon atoms.

2. 2,6-diaminocyclohexanol.
3. 2,6-diamino-3,3,5-trimethylcyclohexanol.
4. 2,6-diamino-4-octylcyclohexanol.
5. 2,6-diamino-3-methylcyclohexanol.
6. 2,6-diamino-4-ethylcyclohexanol.
7. The process of producing a 2,6-diaminocyclohexanol which comprises contacting gaseous hydrogen, anhydrous ammonia, a compound of the formula:

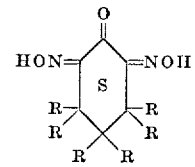

wherein R, individually is selected from the group consisting of hydrogen and alkyl of 1 to 18 carbons; and from 2 to 200 parts by weight of a hydrogenation catalyst per 100 parts by weight of said ketone, said hydrogenation catalyst being of the group consisting of nickel, cobalt, platinum and palladium; at a temperature within the range of from 25° to 200° C. and a total pressure within the range of from 100 p.s.i.g. to 5000 p.s.i.g.

8. The process of claim 7 wherein the ketone and catalyst are present in approximately equal parts by weight.
9. The process of claim 7 wherein the molar ratio of ammonia to ketone is up to 30:1.
10. The process of claim 9 wherein the ketone is 2,6-dioximinocyclohexanone.

[1] Determined with a Barcol Impressor GYZJ 934–1.

References Cited in the file of this patent

FOREIGN PATENTS 282,083    Great Britain _____ Nov. 8, 1928

OTHER REFERENCES

Gauthier: Ann. Chim., volume 20, pages 628 (1945).
Mousseron et al.: Volume of 1947, pages 856–857.
Adkins et al.: J.A.C.S., volume 70, pages 695–698 (1948).
Mousseron et al.: Compt. rend., volume 229, pages 216–218 (1949).
Beck et al.: J.A.C.S., volume 74, pages 605–608 (1952).

UNITED STATES PATENT OFFICE
CERTIFICATE OF CORRECTION

Patent No. 3,112,345            November 26, 1963

Harry A. Stansbury, Jr., et al.

It is hereby certified that error appears in the above numbered patent requiring correction and that the said Letters Patent should read as corrected below.

Column 1, lines 14 to 22, and column 4, lines 7 to 13, the chemical formula should appear as shown below instead of as in the patent:

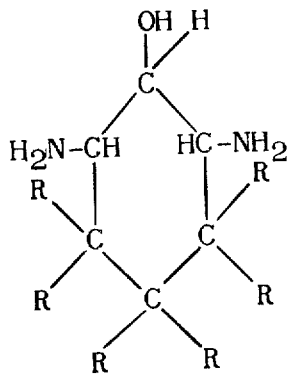

Signed and sealed this 12th day of May 1964.

(SEAL)
Attest:

ERNEST W. SWIDER
Attesting Officer

EDWARD J. BRENNER
Commissioner of Patents